US009124145B2

(12) United States Patent
Lau

(10) Patent No.: US 9,124,145 B2
(45) Date of Patent: Sep. 1, 2015

(54) POWER TOOL

(71) Applicant: JOHNSON ELECTRIC S.A., Murten (CH)

(72) Inventor: James Ching-Sik Lau, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 344 days.

(21) Appl. No.: 13/834,042

(22) Filed: Mar. 15, 2013

(65) Prior Publication Data

US 2013/0200733 A1 Aug. 8, 2013

Related U.S. Application Data

(63) Continuation-in-part of application No. 12/829,825, filed on Jul. 2, 2010, now Pat. No. 8,415,842.

(30) Foreign Application Priority Data

Jul. 3, 2009 (CN) .......................... 2009 1 0108583

(51) Int. Cl.
H02K 9/06 (2006.01)
H02K 5/18 (2006.01)
H02K 7/14 (2006.01)
B25F 5/00 (2006.01)
H02K 9/14 (2006.01)
H02K 9/22 (2006.01)

(52) U.S. Cl.
CPC  H02K 9/06 (2013.01); B25F 5/008 (2013.01); H02K 5/18 (2013.01); H02K 7/145 (2013.01); H02K 9/14 (2013.01); H02K 9/22 (2013.01)

(58) Field of Classification Search
CPC .......... B25F 5/008; H02K 5/18; H02K 7/145; H02K 9/06; H02K 9/14; H02K 9/22
USPC ........................................ 310/50, 64, 58, 59
See application file for complete search history.

(56) References Cited

U.S. PATENT DOCUMENTS

| 4,322,646 A | 3/1982 | Persson |
| D325,560 S | 4/1992 | Baines |
| 5,877,576 A | 3/1999 | CoChimin |
| 5,925,947 A | 7/1999 | Kajiwara et al. |

(Continued)

FOREIGN PATENT DOCUMENTS

| CN | 1945931 | 4/2007 |
| DE | 10 2009 015422 A1 | 10/2009 |

(Continued)

Primary Examiner — Alex W Mok
(74) Attorney, Agent, or Firm — Muncy, Geissler, Olds & Lowe, P.C.

(57) ABSTRACT

A power tool includes a casing with an inlet and an outlet extending in a radial direction of the casing, a motor installed within the casing between the inlet and the outlet. The motor includes a stator and a rotor with a shaft, an air passage being formed between a radially outer surface of the stator and an inner surface of the casing. The air passage extends in the axial direction of the casing. A heat dissipation device is arranged on the radially outer surface of the stator for absorbing heat from the stator, and is disposed in the air passage. A fan is fixed to the shaft of the rotor. Air flow generated by the fan enters the casing via the inlet and exits the casing via the outlet after passing through the air passage and the heat dissipation device.

15 Claims, 7 Drawing Sheets

(56) References Cited

U.S. PATENT DOCUMENTS

| | | |
|---|---|---|
| 6,050,786 A | 4/2000 | Lin |
| 6,111,235 A | 8/2000 | Ritter et al. |
| 6,145,585 A | 11/2000 | Wei |
| 6,455,186 B1 | 9/2002 | Moores et al. |
| 6,729,414 B2 | 5/2004 | Cooper et al. |
| 7,157,818 B2 | 1/2007 | Jones |
| 7,166,939 B2 | 1/2007 | Voigt et al. |
| 7,323,796 B2 | 1/2008 | Oomori et al. |
| 8,039,999 B2 | 10/2011 | Chen |
| 2003/0184172 A1 | 10/2003 | Ghiotto |
| 2004/0104636 A1 | 6/2004 | Ortt et al. |
| 2004/0263008 A1 | 12/2004 | Voigt et al. |
| 2005/0236917 A1 | 10/2005 | Lui |
| 2005/0269884 A1 | 12/2005 | Teranishi et al. |
| 2006/0012254 A1 | 1/2006 | Einheuser et al. |
| 2006/0013712 A1 | 1/2006 | Lee et al. |
| 2006/0066160 A1 | 3/2006 | Ikuta et al. |
| 2006/0261686 A1 | 11/2006 | Rutsyamuka |
| 2006/0284511 A1 | 12/2006 | Evon et al. |
| 2007/0057588 A1 | 3/2007 | Hyodo et al. |
| 2007/0075595 A1 | 4/2007 | Narayanan et al. |
| 2007/0182269 A1 | 8/2007 | Takahashi et al. |
| 2008/0007916 A1 | 1/2008 | Hogg et al. |
| 2008/0122322 A1 | 5/2008 | Izumi |
| 2008/0231126 A1 | 9/2008 | Telore et al. |
| 2008/0290745 A1 | 11/2008 | Riedl |
| 2008/0309172 A1 | 12/2008 | Tseng |
| 2009/0015079 A1 | 1/2009 | Riedl et al. |
| 2009/0079279 A1 | 3/2009 | Cheng et al. |
| 2009/0096300 A1 | 4/2009 | Oyoung et al. |
| 2009/0121564 A1 | 5/2009 | Pal et al. |
| 2009/0127946 A1 | 5/2009 | Fee et al. |
| 2009/0145621 A1 | 6/2009 | Lau et al. |
| 2009/0200878 A1 | 8/2009 | Walter |

FOREIGN PATENT DOCUMENTS

| | | | |
|---|---|---|---|
| EP | 0001222 A1 | | 4/1979 |
| EP | 0697761 A1 | | 2/1996 |
| GB | 2209878 A | | 5/1999 |
| JP | 2001251815 A | * | 9/2001 |
| JP | 2009-137011 A | | 6/2009 |

* cited by examiner

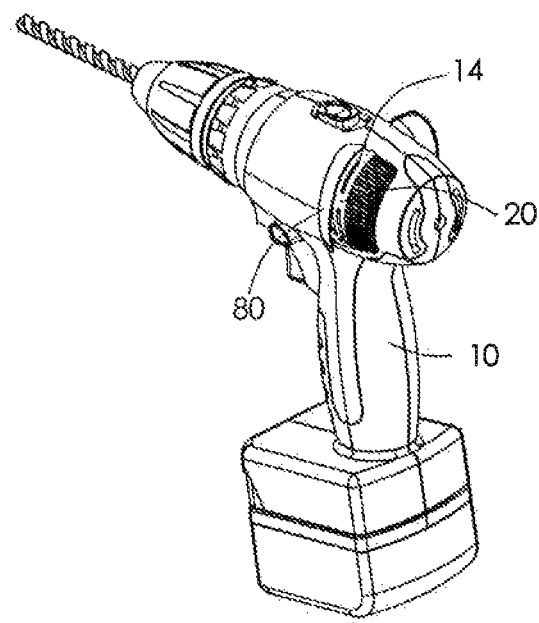
FIG. 9
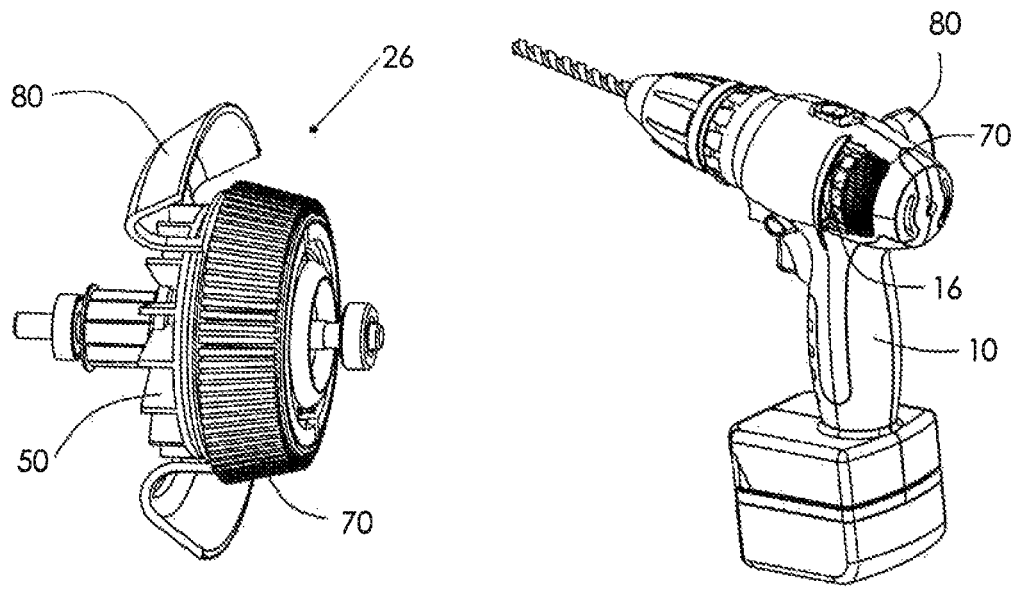
FIG. 10
FIG. 11

POWER TOOL

CROSS REFERENCE TO RELATED APPLICATIONS

This application is a continuation-in-part of co-pending application Ser. No. 12/829,825 filed on Jul. 2, 2010, for which priority is claimed under 35 U.S.C. §120; and this application claims priority of Application No. 200910108583.9 filed in The People's Republic of China on Jul. 3, 2009 under 35 U.S.C. §119, the entire contents of all of which are hereby incorporated by reference.

FIELD OF THE INVENTION

This invention relates to power tools and in particular to a motor assembly for use in a power tool.

BACKGROUND OF THE INVENTION

Power tools such as drills are widely used. A power tool generally comprises a motor and a speed reduction gear box. The motor's output speed is reduced by the gear box, while the motor's output torque is increased. A lot of heat is generated during high load operation of the motor. The performance of the motor will be affected if the heat is not dissipated in time.

SUMMARY OF THE INVENTION

Hence there is a desire for a power tool having a motor with improved cooling.

Accordingly, in one aspect thereof, the present invention provides a power tool comprising: a casing with an inlet and an outlet extending in a radial direction of the casing; a motor installed within the casing between the inlet and the outlet, the motor comprising a stator and a rotor with a shaft, an air passage being formed between a radially outer surface of the stator and an inner surface of the casing, the air passage extending in a direction parallel to an axial direction of the casing; a heat dissipation device being arranged on the radially outer surface of the stator for absorbing heat from the stator, the heat dissipation device being disposed in the air passage; and a fan attached to the shaft of the rotor, wherein air flow generated by the fan enters the casing via the inlet and exits the casing via the outlet after passing through the air passage and heat dissipation device.

Preferably, the fan is a centrifugal fan that is located at one end of the motor with a radially outer side of the fan facing the outlet.

Preferably, the fan extends radially beyond the radially outer surface of the stator.

Preferably, the heat dissipation device comprises a plurality of fins that extend in a direction parallel to the axial direction of the casing.

Preferably, axial ends of the fins extend beyond axial ends of the stator.

Preferably, the fan is located within a space formed between a first axial end of the stator and the axial ends of the fins extending beyond said first axial end of the stator.

Preferably, the axial ends of the stator are enclosed by the heat dissipation device.

Preferably, the heat dissipation device is a monolithic structure of heat conductive plastic formed on the stator by over-molding.

In another aspect thereof, the present invention provides a power tool comprising: a casing with an inlet and an outlet, the outlet extending in a direction parallel to a radial direction of the casing; and a motor assembly installed within the casing, the motor assembly comprising a motor, a heat dissipation device, and a centrifugal fan, the motor comprising a stator and a rotor having a shaft; the heat dissipation device being arranged on a radially outer surface of the stator for absorbing heat from the stator, the heat dissipation device comprising a plurality of spaced fins, the fins arranged inside the casing in an axial direction of the casing with channels formed between adjacent fins, the fan being attached to the shaft of the rotor with a radially outer side of the fan facing the outlet, wherein air flow generated by the fan enters the casing via the inlet and exits the casing via the outlet after passing through the channels.

Preferably, the heat dissipation device is a monolithic structure formed on the stator by over-molding, the heat dissipation device comprising two end walls respectively encasing axial ends of the stator.

Preferably, one axial end of the fins extends axially beyond the stator for increasing heat dissipating surface area.

Preferably, the fan is located within a space formed between an axial end of the stator and said one axial end of the fins.

Preferably, both axial ends of the fins respectively extend axially beyond the stator for increasing heat dissipating surface area.

Preferably, both axial ends of the stator are enclosed.

Preferably, the air flow enters the inlet in a direction parallel to the axial direction of the casing.

A motor assembly as well as a power tool according to preferred embodiments of the present invention comprises a fan, guiding member and a heat dissipation device fitted to the motor. Air flow generated by the fan is guided to the heat dissipation device to achieve an improved cooling effect.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 9 illustrates a power tool according to another embodiment of the present invention;

FIG. 10 illustrates a motor assembly of the power tool shown in FIG. 9;

FIG. 11 illustrates the power tool of FIG. 9 with a part removed;

DETAILED DESCRIPTION OF THE PREFERRED EMBODIMENTS

Figure 1:
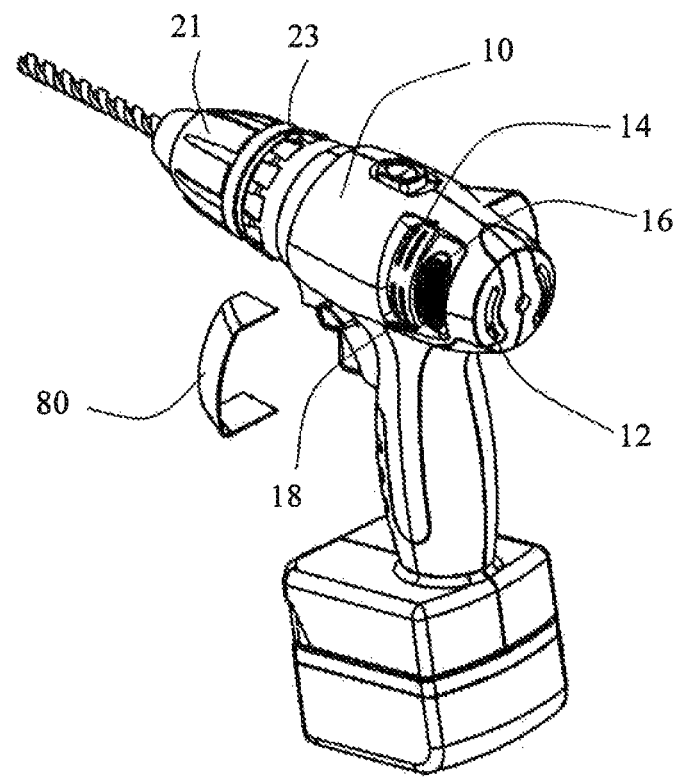
FIG. 1 illustrates a power tool according to the preferred embodiment of the present invention.
Figure 2:
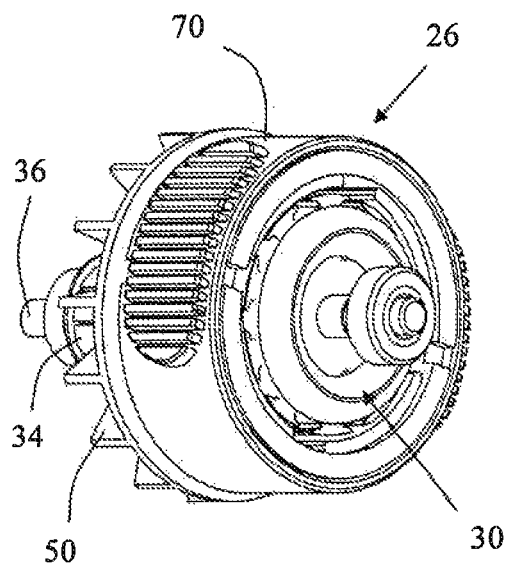
FIG. 2 illustrates a motor assembly of the power tool of FIG. 1.
Figure 3:
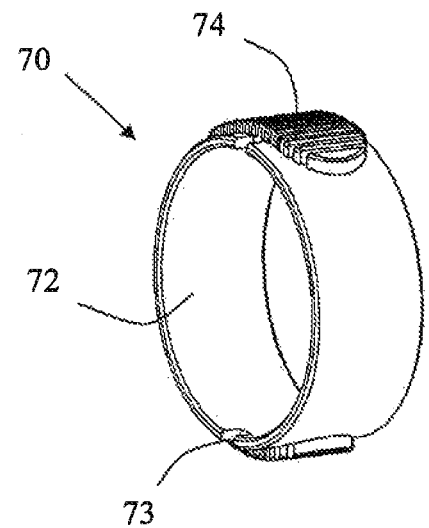
FIG. 3 illustrates a heat dissipation device of the motor assembly shown in FIG. 2.

The preferred embodiment of the present invention will be described with reference to FIGS. 1 to 4. It should be understood that the power tool according to the present invention can be a power drill, power hammer, electric saw, electric wrench, etc. A portable, battery operated, power drill will be used hereafter to describe the invention by way of example only.

A power drill according to the preferred embodiment of the present invention, as shown in FIGS. 1 to 4, comprises a casing 10 and a motor assembly 26 disposed within the casing. The casing 10 defines an inlet 12 and an outlet 14 for the flow of air through the casing to cool the motor. Preferably, the inlet 12 extends in the axial direction of the casing 10 and the outlet 14 extends in a direction parallel to the radial direction of the casing 10. The axial direction of the casing is defined as the direction parallel to the axis of the shaft of the motor. The power tool, being a portable drill, also has a chuck 21 for holding drill bits and a torque control mechanism 23.

The motor assembly 26 comprises a motor 30 and a fan 50 driven by the motor. In this embodiment, the fan 50 is fixed to a rotor of the motor 30. The rotor includes a shaft 36 and a rotor core and a commutator 34 fixed to the shaft. The motor has a housing 32 forming a part of the stator of the motor. A heat dissipation device 70 is disposed about an outer surface of the stator, i.e. fitted to the radially outer surface of the housing 32. The heat dissipation device 70 preferably comprises an annular heat absorbing section 72 and a plurality of fins 74 arranged at the radially outer surface of the heat absorbing section for dissipating heat. The heat absorbing section 72 is fitted to the outer surface of the housing 32. Thermally conductive adhesive may be used to fix the heat absorbing section 72 to the motor housing and to fill any spaces between the housing 32 and the heat absorbing section 72 to improve the heat transfer. Small cutouts 73 are formed at both axial ends of the heat absorbing section 72, and small cutouts 33 are formed at both axial ends of the housing 32 of the motor 30. The small cutouts 73 as well as cutouts 33 engage ribs on the inner surface of the casing 10 of the power drill, so as to limit axial and circumferential movement of the motor 30/heat dissipation device 70.

Figures 4, 5:
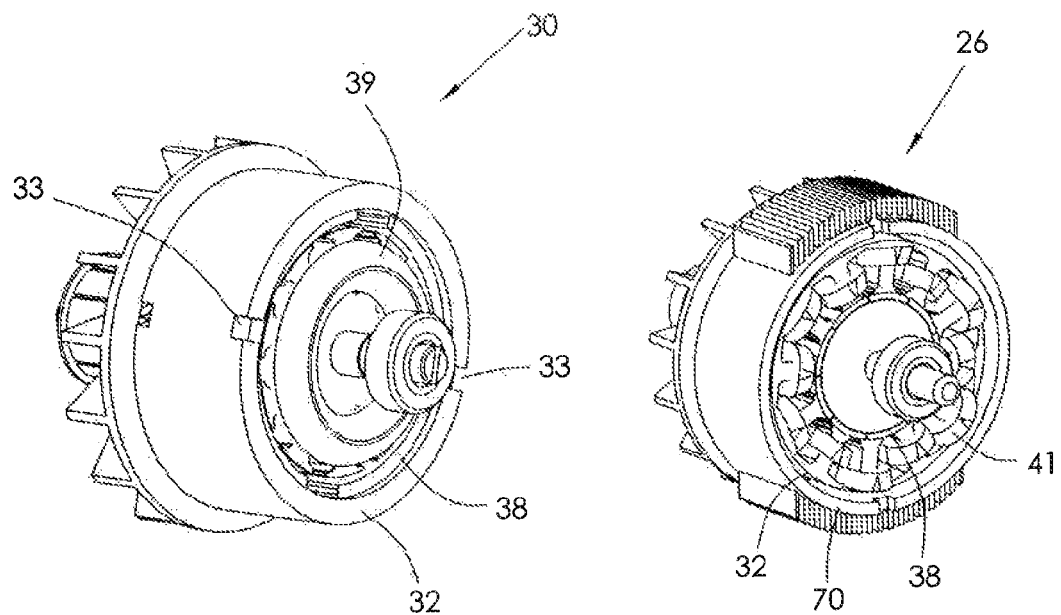
FIG. 4 shows the motor assembly without the heat dissipation device.
FIG. 5 illustrates a motor assembly according to another preferred embodiment of the present invention.
Figure 6:
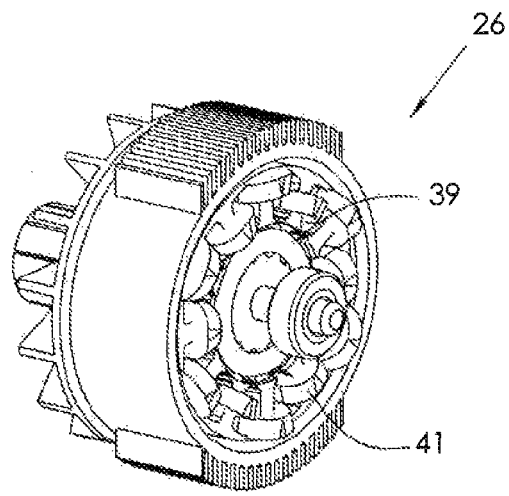
FIG. 6 illustrates a motor assembly according to a further preferred embodiment of the present invention.

Optionally, an airflow passage is provided inside the housing 32. In this embodiment, the airflow passage extends from one axial end of motor to the other. Motor 30 can be a commutator motor such as PMDC motor having, permanent magnets 38 fixed to an inner surface of the housing, rotor windings 39 and a commutator, as shown in FIG. 4. Alternatively, motor 30 may be a brushless motor, with salient poles with stator windings 41 arranged inside the housing 32, and magnets 38 fixed to the rotor, as shown in FIG. 5. Furthermore, motor 30 may be a universal motor, having stator windings 41 wound about salient poles arranged inside the housing 32, and rotor windings 39 wound on the rotor, as shown in FIG. 6.

Preferably, heat dissipation device 70 is made of aluminum. However, it is apparent that heat dissipation device 70 can be made of any other suitable heat conductive material. Fins 74 of heat dissipation device 70 are arranged on a part of outer surface of annular heat absorbing section 72. Optionally, the fins 74 are spaced apart and parallel to each other, and extend in the axial direction of the casing 10. In FIG. 6, the fins 74 are arranged on two diametrically opposite surface portions of the heat absorbing section 72. Casing 10 of the power drill comprises two openings 16 to expose the fins 74. Further more, the fins 74 may extend outside of the casing through the openings 16. The heat in the housing 32 such as the heat generated by the stator windings is quickly absorbed by the annular heat absorbing section 72, and the heat is dissipated by the fins 74. Heat dissipation surface area of the heat dissipation device 70 is increased by the fins 74.

A guiding member 80, as shown in FIG. 1, is arranged at each outlet 14 of the casing 10. The airflow generated by the fan 50 is guided to the fins 74 by the guiding members, so that cooling is improved.

Preferably, the guiding member 80 comprises a pair of U-shaped sections, and the casing 10 comprises two outlets 14. A pair of locking slots 18 are formed at opposite ends of each outlet 14 for engaging the ends of the U-shape sections which are adapted to mate with and be captured by the locking slots. In FIG. 1 the closer U-shaped section is located spaced from the casing, in a manner ready to be fitted to the casing, to more clearly show the outlet 14 which it will partially cover when assembled.

During operation, airflow generated by fin 50 comes into the casing 10 through the inlet 12, through one axial end of motor 30 into interior space of the motor 30 through the airflow passage, out through the other axial end of the motor and then guided to the fins 74 by the airflow guiding member 80. Thus the airflow engages with the fins to quickly dissipate the heat contained therein. The airflow passage through the motor may be formed by the air gap between the stator and the rotor, the gap between rotor windings, the gap between the magnets, etc.

Figure 7:
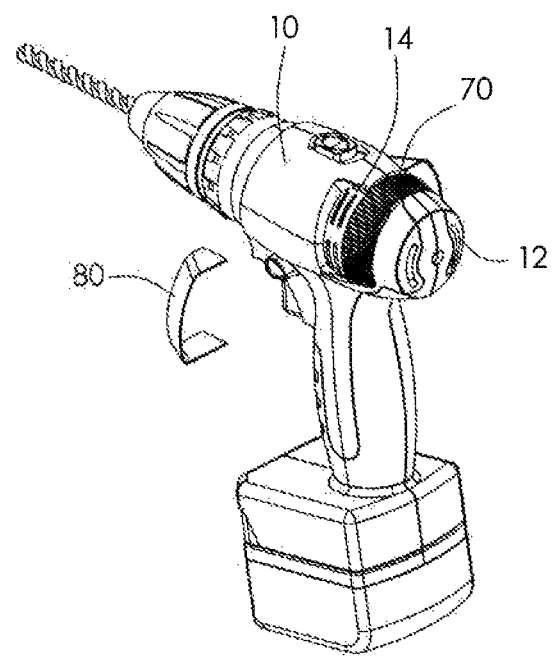
FIG. 7 illustrates a power tool according to another preferred embodiment of the present invention.
Figure 8:
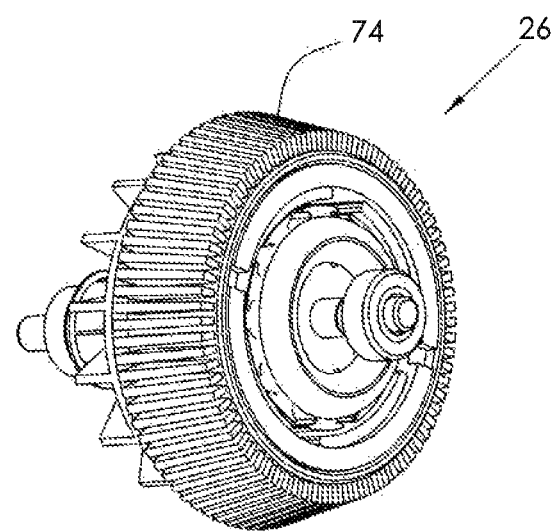
FIG. 8 illustrates a motor assembly according to another embodiment of the present invention.

In an alternative embodiment shown in FIGS. 7 and 8, the fins 74 are arranged on the whole radially outer surface of the heat absorbing section 72. The casing 10 of the power tool has single large slot through which the heat dissipation device 70 extends to expose the fins to the air outside of the casing. The guiding member 80 directs the air coming out of the air outlets 14 in a similar manner as in the first embodiment of FIG. 1.

Referring now to the embodiment of FIGS. 9 to 11, the guiding member 80 is formed by a pair of curved sections integrally formed with the head dissipation device 70. The casing 10 of the power drill comprises two openings 16 through which the pair of curved sections extend. When the motor assembly is installed to the casing, a cap 20 is fitted to each opening 16. Outlets 14 are formed in the caps 20. The flow path of airflow generated by the fan 50 is similar to that describe with reference to the first embodiment. In FIG. 11, the power tool of FIG. 9 is shown with the cap 20 removed to reveal the opening 16 provided to allow the guiding members to pass through the casing during assembly. The caps 20 also provide a safety function by preventing accidental contact with the motor or fan by a user of the power tool.

Figure 12:
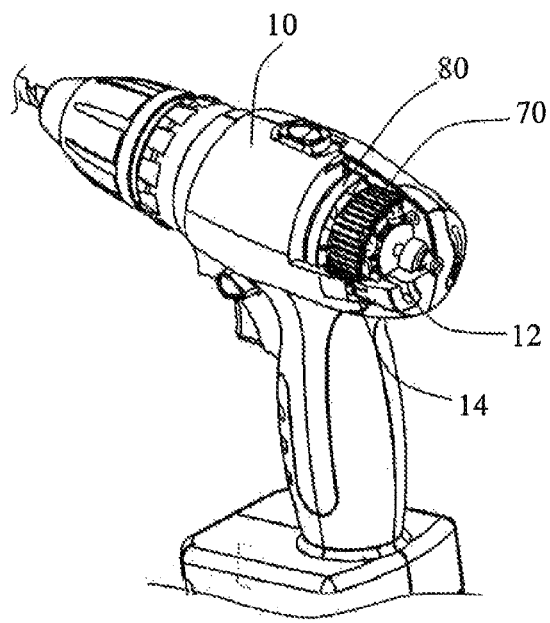
FIG. 12 illustrates a power tool according to a further embodiment of the present invention, wherein a portion of the casing is cut away to expose the motor assembly.
Figure 13:
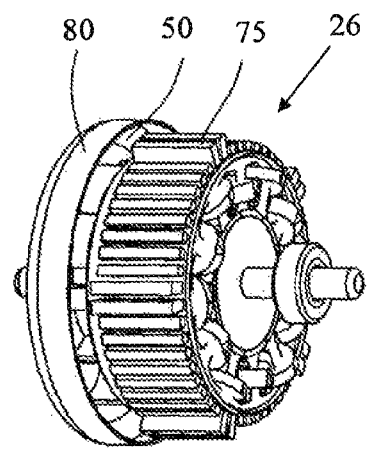
FIG. 13 illustrates the motor assembly of the power tool of FIG. 12.
Figure 14:
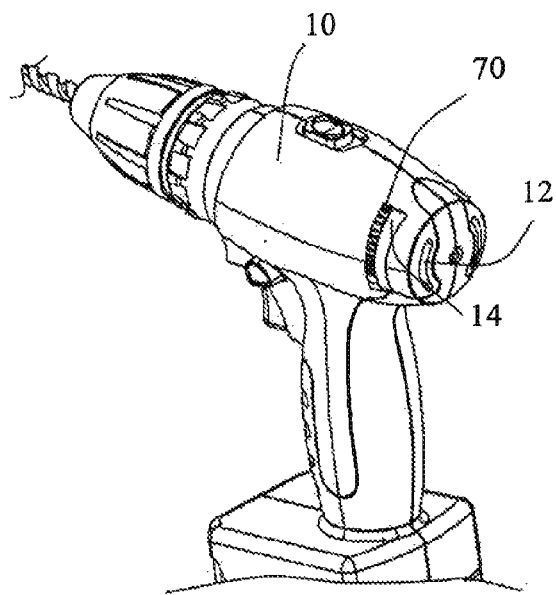
FIG. 14 illustrates the power tool of FIG. 12, with the casing complete.

Referring now to FIGS. 12 to 14, in this embodiment, heat dissipation device 70 is installed inside the casing 10 and in the airflow passage. The airflow generated by the fan comes into the casing from the inlet 12, passes through an airflow passage inside the motor from one axial end of the motor to the other, is guided to the fins 74 of the heat dissipation device 70 by the guiding member 80, and then expelled from the casing 10 through the outlet 14. In this embodiment, the guiding member 80 is hat-shaped and integrally formed with one axial end of the fan 50 and surrounds the fan. Some of the fins 75 have a larger radial dimension than the other fins 74 and contact with an inner surface of the casing 10 so that an air passage is formed between the casing 10 and the motor housing, and the heat dissipation device 70 is disposed in this air passage. FIG. 14 shows the complete power tool whereas in FIG. 12 a portion of the casing 10 has been cut away to reveal the motor assembly with the heat dissipation device 70 located in the air passage within the casing.

Figure 15:
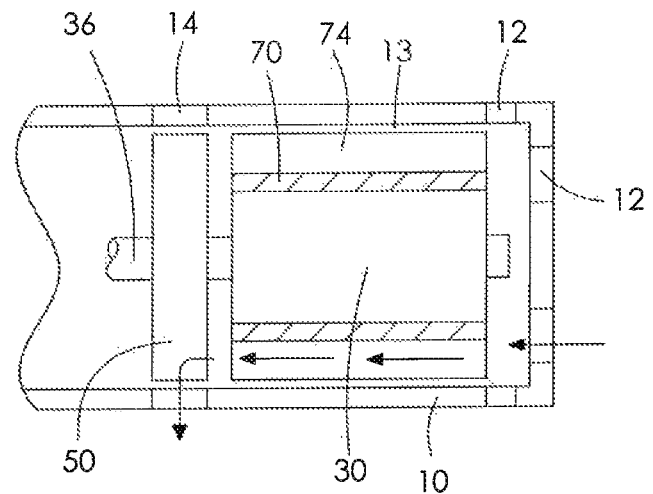
FIG. 15 is a schematic representation of a motor assembly incorporated into a casing of a power tool in accordance with an alternative embodiment of the present invention.

FIG. 15 is a schematical representation of a power tool incorporating a motor assembly according to a further embodiment of the present invention. In the embodiment of FIG. 15, the heat dissipation device 70 is installed inside the casing 10. The motor 30 is installed within the casing and comprises a stator and a rotor rotatably installed within the stator. An air passage 13 is formed between a radially outer surface of the motor and an inner surface of the casing 10. The air passage extends in the axial direction of the casing 10. The heat dissipation device 70 is arranged on the radially outer surface of the motor for absorbing heat from the stator. The heat dissipation device is disposed in the air passage 13. A fan 50 is attached to the shaft 36 of the rotor. The fan 50 is a centrifugal fan which is located at one end of the motor with the radially outer side of the fan 50 facing the outlet 14. In operation, air flow generated by the fan 50 enters the casing 10 via the inlet 12 and exits the casing 10 via the outlet 14 after passing through the air passage 13 and heat dissipation device 70, as indicated by the arrows.

The two axial ends of the stator are preferably enclosed or covered by the heat dissipation device.

Figure 16:
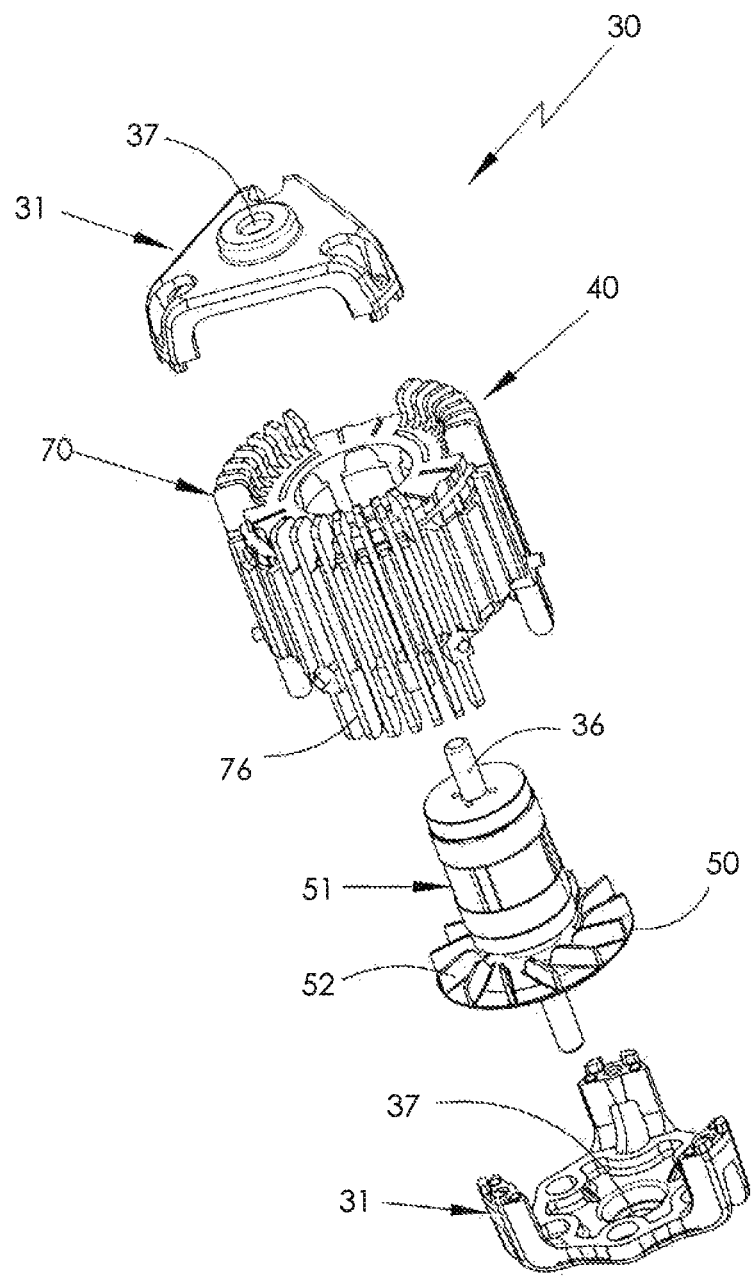
FIG. 16 is a partially exploded view of a motor assembly according to the embodiment of FIG. 15.

FIG. 16 is a partially exploded view of a motor assembly suitable for use in the embodiment of FIG. 15. The motor assembly comprises the motor 30 and the heat dissipation device 70. The motor 30 has a stator 40, a rotor 51 including a shaft 36, and a fan attached to the shaft. The heat dissipation device 70 comprises a plurality of spaced fins 74 which extend in the direction parallel to the axial direction of the motor shaft 36. A plurality of channels is formed between adjacent fins 74. The axial ends 76 of the fins 74 extend beyond the axial ends of the stator. The fan 50 is located within a space formed between one axial end of the stator and the axial ends 76 of the fins 74 extending beyond that end of the stator. The fins are disposed in the air passage 13, preferably forming a bridge between the motor and the casing, such that air passing through the air passage travels along the channels formed between the fins so as to remove heat from the heat dissipating device.

The motor of FIG. 16 has end caps 31 in which bearings 37 are mounted for rotatably supporting the shaft 36. However, as shown in the previous embodiments, the end caps are optional with the bearings being directly supported by the casing 10.

Figure 17:
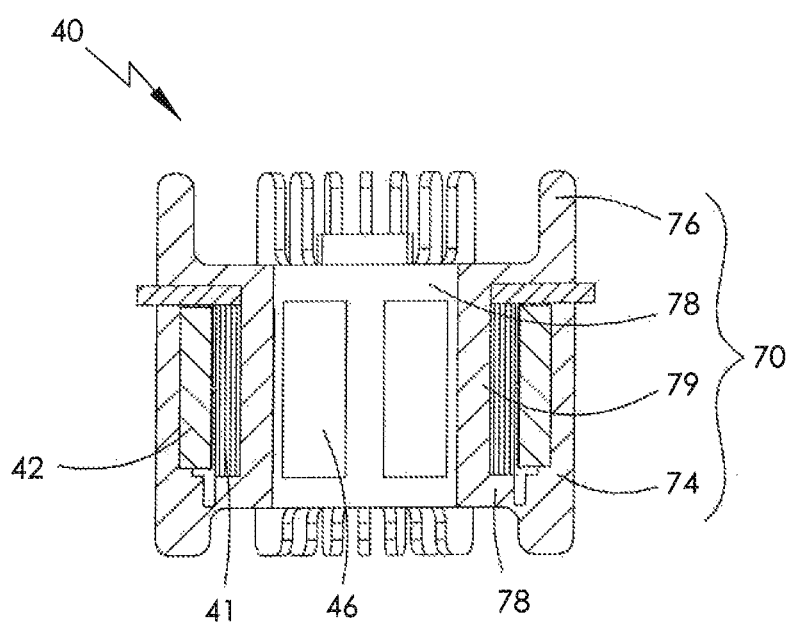
FIG. 17 is a sectional view of a stator, being a part of the motor assembly of FIG. 16.

Preferably, the heat dissipation device 70 is integrally formed on the stator 40 by way of over-molding. That is, the heat dissipation device is formed by molding heat conductive plastic over the stator virtually entirely covering the entire stator, including the windings and filling the gaps between the teeth of the stator core, except for the pole faces 46 of the stator teeth facing the rotor. This is more clearly shown in FIG. 17, which is a sectional view of the stator and heat dissipation device. In this embodiment, the motor is a brushless motor and the stator 40 thereof comprises a stator core 42 and stator windings 41 wound on the stator core 42. The heat dissipation device 70 is made of heat conductive plastic and comprises two end walls 78 respectively encasing the axial ends of the stator 40. An inner portion 79 fills the winding gaps between the stator teeth and covers the stator windings 41. Thus heat is directly removed from the windings by the heat dissipating device.

When the motor assembly is installed within the casing 10 of FIG. 1, the fins 74 of the heat dissipation device 70 are arranged extending in the axial direction of the casing 10. Air passages 13 defined by the fins 74 and the casing 10, also extend in the axial direction of the casing 10. In this embodiment, no guiding member 80 is needed. During operation, airflow generated by the fan 50 comes into the casing 10 through the inlet 12, through the air passages formed between the fins 74 and casing 10, and out the casing 10 via the outlet 14. Thus, heat generated by the stator windings 41 and stator core 42 is transferred to the fins 74 of the heat dissipation device 70 and the airflow flowing passed the fins 74 quickly carries the heat away there from.

Preferably, each of the fins 74 extends continuously in the axial direction of the casing 10. Alternatively, cutouts may be formed in the fins 74 to divide each fin into several parts in the axial direction of the casing 10.

Preferably, the fan 50 is a centrifugal fan. The fan 50 comprises a plurality of blades 52. The radially outer ends of the blades 52 face the axial ends 76 of the fins 74. As such, the fan blows air directly on to the fins.

It will be understood that the fan can be fixed to the shaft of the motor directly or indirectly. Optionally, the fan is attached to a core of the rotor carried by the shaft. Further more, the fan may be installed independently from the motor 30 and be driven by another driving source. Airflow can be guided to heat dissipation device before or after coming out of the casing from outlet 14. Furthermore, airflow generated by the fan can flow inside the motor and/or outside the motor. In an alternative embodiment, the airflow generated by the fan comes inside the casing 10 by inlet 12, and then flows to the outlet 14 through an airflow passage outside the motor instead of inside the motor. This arrangement is desired for use with a fully sealed motor.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A power tool comprising:
   a casing with an inlet and an outlet extending in a radial direction of the casing;
   a motor installed within the casing between the inlet and the outlet, the motor comprising a stator and a rotor with a shaft, an air passage being formed between a radially outer surface of the stator and an inner surface of the casing, the air passage extending in a direction parallel to an axial direction of the casing;
   a heat dissipation device being arranged on the radially outer surface of the stator for absorbing heat from the stator, the heat dissipation device being disposed in the air passage; and a fan attached to the shaft of the rotor, wherein air flow generated by the fan enters the casing via the inlet and exits the casing via the outlet after passing through the air passage and heat dissipation device.

2. The power tool of claim 1, wherein the fan is a centrifugal fan that is located at one end of the motor with a radially outer side of the fan facing the outlet.

3. The power tool of claim 2, wherein the fan extends radially beyond the radially outer surface of the stator.

4. The power tool of claim 1, wherein the heat dissipation device comprises a plurality of fins that extend in a direction parallel to the axial direction of the casing.

5. The power tool of claim 4, wherein axial ends of the fins extend beyond axial ends of the stator.

6. The power tool of claim 5, wherein the fan is located within a space formed between a first axial end of the stator and the axial ends of the fins extending beyond said first axial end of the stator.

7. The power tool of claim 1, wherein the axial ends of the stator are enclosed by the heat dissipation device.

8. The power tool of claim 1, wherein the heat dissipation device is a monolithic structure of heat conductive plastic formed on the stator by over-molding.

9. A power tool comprising:

a casing with an inlet and an outlet, the outlet extending in a direction parallel to a radial direction of the casing; and a motor assembly installed within the casing, the motor assembly comprising a motor, a heat dissipation device, and a centrifugal fan, the motor comprising a stator and a rotor having a shaft;

the heat dissipation device being arranged on a radially outer surface of the stator for absorbing heat from the stator, the heat dissipation device comprising a plurality of spaced fins, the fins arranged inside the casing in an axial direction of the casing with channels formed between adjacent fins, the fan being attached to the shaft of the rotor with a radially outer side of the fan facing the outlet, wherein air flow generated by the fan enters the casing via the inlet and exits the casing via the outlet after passing through the channels.

10. The power tool of claim 9, wherein the heat dissipation device is a monolithic structure formed on the stator by over-molding, the heat dissipation device comprising two end walls respectively encasing axial ends of the stator.

11. The power tool of claim 10, wherein one axial end of the fins extends axially beyond the stator for increasing heat dissipating surface area.

12. The power tool of claim 11, wherein the fan is located within a space formed between an axial end of the stator and said one axial end of the fins.

13. The power tool of claim 10, wherein both axial ends of the fins respectively extend axially beyond the stator for increasing heat dissipating surface area.

14. The power tool of claim 10, wherein the air flow enters the inlet in a direction parallel to the axial direction of the casing.

15. The power tool of claim 9, wherein both axial ends of the stator are enclosed.

* * * * *